United States Patent
Rustichelli (10) Patent No.: US 12,362,633 B2
(45) Date of Patent: Jul. 15, 2025

(54) ELECTRIC MACHINE ROTOR COOLING CARTRIDGE

(71) Applicant: Wuhan Lotus Cars Co., Ltd., Hubei (DE)

(72) Inventor: Stefano Rustichelli, Reggio Emilia (IT)

(73) Assignee: WUHAN LOTUS CARS CO., LTD., Wuhan (CN)

( * ) Notice: Subject to any disclaimer, the term of this patent is extended or adjusted under 35 U.S.C. 154(b) by 320 days.

(21) Appl. No.: 18/043,283

(22) PCT Filed: Aug. 27, 2021

(86) PCT No.: PCT/EP2021/073811
§ 371 (c)(1),
(2) Date: Feb. 27, 2023

(87) PCT Pub. No.: WO2022/049009
PCT Pub. Date: Mar. 10, 2022

(65) Prior Publication Data
US 2024/0014710 A1    Jan. 11, 2024

(30) Foreign Application Priority Data
Sep. 3, 2020    (EP) ..................... 20194259

(51) Int. Cl.
*H02K 9/19*    (2006.01)
*H02K 1/2706*    (2022.01)
(Continued)

(52) U.S. Cl.
CPC ............. *H02K 9/19* (2013.01); *H02K 1/2706* (2013.01); *H02K 5/203* (2021.01); *H02K 7/003* (2013.01)

(58) Field of Classification Search
CPC ....................................................... H02K 1/32
See application file for complete search history.

(56) References Cited

U.S. PATENT DOCUMENTS

| | | | |
|---|---|---|---|
| 5,589,720 A * | 12/1996 | Berger | H02K 9/197 310/61 |
| 9,257,883 B2 * | 2/2016 | Büttner | H02K 9/16 |

(Continued)

FOREIGN PATENT DOCUMENTS

DE    102011078784 A1    1/2013

OTHER PUBLICATIONS

International Search Report for International Application No. PCT/EP2021/073811, mailed on Dec. 13, 2021, in 17 pages.
(Continued)

*Primary Examiner* — Tran N Nguyen
*Assistant Examiner* — Masoud Vaziri
(74) *Attorney, Agent, or Firm* — JCIPRNET (57) ABSTRACT

The disclosure relates to an electric machine cooling system comprising a cooling cartridge arranged inside and coaxial to an inner hollow shaft of an inner rotor. The cooling cartridge is a polymer cartridge that is interchangeably attached to the inner rotor. The cooling cartridge includes an inner coolant tube having an internal coolant duct configured to lead coolant from an inlet opening of the inner coolant tube to a closed dead-end of the cooling cartridge, and an outer coolant sleeve comprising coolant channels which are fluidically connected with the internal coolant duct via at least one connection channel and which are configured to lead the coolant from the at least one connection channel to at least one outlet opening.

13 Claims, 3 Drawing Sheets

(51) Int. Cl.
*H02K 5/20* (2006.01)
*H02K 7/00* (2006.01)

(56) References Cited

U.S. PATENT DOCUMENTS

| | | | | |
|---|---|---|---|---|
| 2008/0272661 | A1* | 11/2008 | Zhou | H02K 9/197 |
| | | | | 310/61 |
| 2015/0280523 | A1* | 10/2015 | Tremelling | H02K 7/09 |
| | | | | 29/598 |
| 2015/0288255 | A1* | 10/2015 | Barker | H02K 1/2781 |
| | | | | 310/43 |
| 2018/0269743 | A1* | 9/2018 | Büttner | F16J 15/3404 |
| 2020/0259396 | A1* | 8/2020 | Konopa | F04D 29/584 |
| 2020/0373815 | A1* | 11/2020 | Lang | H02K 7/083 |
| 2023/0034673 | A1* | 2/2023 | Walbaum | H02K 1/32 |
| 2023/0105191 | A1* | 4/2023 | Krank | H02K 9/197 |
| | | | | 310/54 |

OTHER PUBLICATIONS

Extended European Search Report for European Patent Application No. 20194259.6, mailed on Feb. 26, 2021, in 9 pages.

* cited by examiner

ELECTRIC MACHINE ROTOR COOLING CARTRIDGE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to electric machine cooling by an interchangeable rotor cooling cartridge. In particular, the present disclosure relates to an electric machine cooling system for automotive applications comprising an electric machine and an interchangeable cooling cartridge for cooling a rotor of the electric machine. The present disclosure further relates to a method for cooling an electric machine by an interchangeable rotor cooling cartridge.

Description of the Related Art

In the automotive industry as well as in other vehicle industries there is an ongoing trend towards electric vehicles that use electric machines/electric motors for propulsion, instead of or in addition to conventional combustion engines.

Most electric machines used in automotive applications can provide a peak power and peak torque for a very limited time period, e.g. for only five to ten seconds. After this limited time period, the electric machines have a substantially reduced performance and can only provide a maximum of fifty percent or less of the peak power and peak torque. Thus, in permanent or long-term use electric machines have to be operated way below their maximum peak power. Consequently, electric machines are often oversized in order to provide a sufficient performance level for permanent or long-term use. This has disadvantages with regard to size and weight requirements.

One reason why prior art electric machines can only be operated with a substantially reduced performance during permanent use is the high amount of heat produced during operation of the electric machines, in particular during operation with more than fifty percent of the peak power. Thus, effective cooling of electric machines is one factor that determines the continuous performance level of electric machines.

A solution for cooling an electric machine is known from document U.S. Pat. No. 8,395,287 B2, which suggests an electric machine including a stator assembly with a plurality of stator laminations. The plurality of stator laminations include a plurality of different outer diameters and some of the plurality of stator laminations include at least two different radii. At least one circumferential stator coolant channel and at least one axial coolant channel are defined by the plurality of stator laminations.

Further, document U.S. 2018/269744 A1 discloses an electrical machine comprising a stator having radial passages arranged circumferentially along the stator. The radial passages comprise fluid-circulation galleries facing magnetic-flux generators. The axial galleries are located between the windings, an external edge of bearings and stator teeth so as to form a stator grating allowing a fluid to pass through it.

Document U.S. 2002/195887 A1 discloses a cooling structure for a rotating electric machine. A rotating shaft of a rotor is provided with a hollow structure and an inner cylindrical section. Coolant flows through an annular gap between the rotating shaft and the inner cylindrical section from one end of the rotor to an opposite end of the rotor.

Further, document U.S. Pat. No. 7,489,057 B2 suggests another rotor cooling system. The rotor comprises a hollow rotor shaft including an open end and a closed end. A coolant feed tube is rigidly attached to the rotor shaft using one or more support members, thus causing the shaft and the feed tube to rotate at the same rate. Coolant is pumped through the feed tube until it exits the end of the feed tube and flows against the inside surface of the closed end of the rotor shaft causing the coolant to change direction and flow back through a coolant flow region.

However, prior art electric machine cooling systems often have a complex configuration with arrangement limitations and a low cooling efficiency.

SUMMARY

It is an object of the present disclosure to provide an electric machine cooling system which has improved characteristics and overcomes at least some of the disadvantages of the prior art.

In particular, it is an object of the present disclosure to provide an electric machine cooling system that increases a continuous performance of a cooled electrical machine.

In particular, it is an object of the present disclosure to provide an electric machine cooling system that has a simple structure and has an improved cooling efficiency.

These and other objects are addressed in the present disclosure.

The disclosure relates to an electric machine cooling system for a vehicle. The electric machine can be an electric motor for a vehicle, in particular an automotive vehicle, a truck, a motorcycle, an aircraft, an electric bike, etc.

The electric machine cooling system comprises an electric machine having an inner rotor and an outer stator. The inner rotor is rotatable about an axis of rotation and has or forms an inner hollow shaft. The inner hollow or tubular shaft can be a separate component that is fixedly attached to an inner circumferential surface of the inner rotor. The inner hollow shaft can be a cylindrical shaft having a longitudinal axis corresponding to the axis of rotation, wherein an axial extension of the inner hollow shaft exceeds an axial extension of the inner rotor. Hence, a first end and/or an opposite second end of the inner hollow shaft can extend beyond the inner rotor, i.e. can be arranged outside the inner rotor.

The electric machine cooling system further comprises a cooling cartridge arranged inside and coaxial to the inner hollow shaft of the inner rotor. The cooling cartridge can be a cylindrical cartridge having a longitudinal axis corresponding to the axis of rotation, wherein an axial extension of the cooling cartridge substantially equals or is less than an axial extension of the inner rotor. Hence, the cooling cartridge can be arranged completely inside the inner rotor, not extending beyond the inner rotor.

The cooling cartridge is a polymer cartridge. In other words, the cooling cartridge is made of polymer. In some embodiments, all parts and components of the cooling cartridge are polymeric. Preferable polymer materials forming the cooling cartridge are for example PA66+GF, PA46+GF, PPS+GF or PPA+GF (GF=Glass Fiber).

The cooling cartridge is interchangeably attached to the inner rotor, more precisely to the inner hollow shaft, so as to be rotatable with the inner rotor about the axis of rotation. Rotatably attached to the inner rotor means that the cooling cartridge is rotatable together with the inner rotor. Hence, the cooling cartridge is non-rotatably attached to and thus non-rotatable relative to the inner rotor. Interchangeably attached means that the cooling cartridge is removably attached and is thus replaceable. In particular, the cooling cartridge can be interchangeably attached to the inner hollow shaft, in some embodiments to an inner circumferential surface of the inner hollow shaft.

The cooling cartridge includes an inner coolant tube having an internal coolant duct configured to lead coolant, in some embodiments oil, from an inlet opening of the inner coolant tube to a closed dead-end of the cooling cartridge. The closed dead-end being in particular a closed dead-end of the inner coolant tube. The inner coolant tube can be a longitudinally elongated coolant tube. The inlet opening being in some embodiments formed at a first axial end of the inner coolant tube, in particular in a front surface of the inner coolant tube. The closed dead-end being in some embodiments formed at a second axial end of the inner coolant tube opposite to the first axial end.

The cooling cartridge further includes an outer coolant sleeve, being in some embodiments a longitudinally elongated outer coolant sleeve. The outer coolant sleeve is arranged between the inner coolant tube and the inner rotor, more precisely between the inner coolant shaft and an inner circumferential surface of the inner hollow shaft. The outer coolant sleeve comprises a plurality of coolant channels which are fluidically connected with the internal coolant duct via at least one connection channel in a region of the closed dead-end and which are configured to lead the coolant from the at least one connection channel to at least one outlet opening of the outer coolant sleeve. The coolant channels being arranged in the region of the dead-end can mean that the coolant channels are arranged in the vicinity of the dead-end, in particular axially adjacent and/or close to the dead-end, in some embodiments less than the 15 mm, in further embodiments less than 10 mm, in further embodiments less than 7 mm from the dead-end. The coolant channels can be longitudinally elongated cooling channels. The coolant channels can extend substantially parallel to the axis of rotation and/or can extend in a circumferential direction at least along a portion of the coolant channels. The coolant channels can have any desired shape. The coolant channels can all have the same or partially different shapes. The coolant channels can be evenly distributed around the circumference of the outer coolant sleeve. In some embodiments, the cooling cartridge comprises a plurality of connection channels, in particular one connection channel for each coolant channel. In some embodiments, the cooling cartridge comprises a plurality of outlet openings, in particular one outlet openings for each coolant channel. The connection channel or connection channels can extend transversally to the axis of rotation, and thus to the longitudinal axis of the cooling cartridge, through a body of the inner coolant tube and/or through a body of the outer coolant sleeve. To this, the at least one connection channel can comprise a first portion formed in the inner coolant tube and can comprise a second portion formed in the outer coolant sleeve. The first portion and the second portion of the connection channel are aligned with one another.

As the cooling cartridge is made of polymer, the inner coolant duct and the outer coolant sleeve are made of polymer. In some embodiments, the inner coolant duct and the outer coolant sleeve are made of the same polymer material.

The coolant or cooling fluid can in some embodiments be oil. Alternatively, the coolant can be any another cooling liquid. Oil cooling has the advantage that it enables reaching very close to where the heat is generated, because there are much less electrical insulation issues compared e.g. to water cooling.

The electric machine cooling system provides an advantageous configuration with a modular polymer cooling cartridge that can be simply and properly installed inside the rotor shaft. This served to achieve an effective channeling of coolant, thus ensuring an effective cooling of rotor magnets, rotor stack and rotor bearings. Since the cartridge is interchangeable, it can be removed and replaced in accordance with the particular cooling needs of the rotor, for example depending on number and arrangement of permanent magnets, switching frequency, duty cycle, ect. In other words, it the electric machine cooling system can be flexibly adapted to different applications. Thus, the interchangeable design and adaptability of the electric machine cooling system increases the cooling efficiency. Along with this, configuring the interchangeable cooling cartridge as a polymer component has advantageous impacts on the mass of the rotor (mass reduction in the center) and on the realization of advantageous shapes of the coolant channels, which further contributes to an increased cooling efficiency. Consequently, the electric machine cooling system increases a continuous performance of a cooled electrical machine.

The inner coolant tube and the outer coolant sleeve can be separate components that are attached to each other by sealing arrangements. In this case, the inner coolant tube and the outer coolant sleeve of the cooling cartridge are fixedly attached in a non-rotatable manner relative to each other, but rotatable together relative to the stator. Alternative to a separate configuration, the inner coolant tube and the outer coolant sleeve can be integrally formed as a single-piece component. In this case, the cooling cartridge can be manufactured by additive manufacturing.

In an embodiment, the coolant channels can be formed on an outer circumferential surface of the outer coolant sleeve as radially open coolant channels. More precisely, the coolant channels can be radially open with respect to the longitudinal axis of the cooling cartridge/the longitudinal axis of the inner rotor/the axis of rotation, i.e. open towards the inner hollow shaft or open in a direction facing away from the axis of rotation. The coolant channels can be enclosed—i.e. encompassed, bordered, closed—by the outer circumferential surface of the outer coolant sleeve and an inner circumferential surface of the inner hollow shaft, such that coolant flowing through the cooling channels directly contacts the coolant sleeve and the inner hollow shaft. This further increases cooling efficiency as heat can be transferred directly from the inner hollow shaft of the inner rotor to the coolant, by which the heat is evacuated from the electric machine cooling system. In some embodiments, the coolant channels can be radially open along their complete length/extension.

According to an embodiment, the cooling cartridge and the inner rotor can be rotatably supported on a housing structure or frame structure via the inner hollow shaft of the inner rotor. The cooling cartridge can be rotatably supported on the housing or frame structure directly and/or indirectly via the inner hollow shaft. Directly supported via the inner hollow shaft means that the inner hollow shaft provides a bearing surface for a bearing arrangement arranged between the inner hollow shaft and a housing structure or frame structure. Thus, the bearing arrangement abuts the inner hollow shaft and the housing structure or frame structure. Indirectly supported via the inner hollow shaft means that the inner hollow shaft is attached to at least one further component that provides a bearing surface for a bearing arrangement arranged between the at least one further component and a housing structure or frame structure for rotatably supporting the inner rotor and all components attached thereto. In some embodiments, the cooling cartridge and the inner rotor can be rotatably supported on a housing structure or frame structure via the inner hollow shaft directly on one side laterally to the inner rotor and indirectly on another side laterally to the inner rotor, the one side being axially spaced from the other side. In particular, the cooling cartridge and the inner rotor can be rotatably supported directly by the inner hollow shaft on a side on which the inner hollow shaft provides a mechanical link to an output shaft of the electric machine. The cooling cartridge and the inner rotor can be rotatably supported indirectly by the inner hollow shaft on a side on which the inlet opening and the at least one outlet opening of the cooling cartridge are located, i.e. opposite to the closed dead-end.

In an embodiment, the electric machine cooling system can further comprise a closing cap shaft being aligned with and arranged adjacent to the cooling cartridge so as to secure the cooling cartridge inside the inner hollow shaft of the inner rotor. The closing cap shaft is coaxial to the cooling cartridge. Arranged adjacent to the cooling cartridge refers to an arrangement in the axial direction. Thus, the cooling cartridge follows the closing cap shaft in the axial direction, when viewed from the inlet opening towards the dead-end. An end surface of the closing cap shaft can abut the front surface of the cooling cartridge. The closing cap shaft axially fasten and hold the cooling cartridge inside the inner hollow shaft. On an opposite side of the cooling cartridge facing away from the closing cap shaft, an end surface of the cooling cartridge can abut a tapering section of the inner hollow shaft, tapering in direction towards the axis of rotation, and can thus be axially held inside the inner hollow shaft. The closing cap shaft embodies a simple configuration that reliably secures the cooling cartridge in an intended position and at the same time allows an interchangeability of the cooling cartridge.

The closing cap shaft can comprise an insertion portion. The insertion portion can extend into the inner hollow shaft and can be attached to the inner hollow shaft, in some embodiments by a sealing arrangement, so that the closing cap shaft is rotatable with the inner rotor about the axis of rotation. Rotatable with the inner rotor means also that the closing cap shaft is non-rotatable relative to the inner rotor.

The closing cap shaft can provide an inlet passage fluidically connected with the inlet opening of the inner coolant tube of the cooling cartridge for leading the coolant from a main coolant input to the internal coolant duct. The main coolant input can be provided in a housing or frame structure internal or external to the electric machine cooling system.

The closing cap shaft can provide at least one outlet passage fluidically connected with the at least one outlet opening of the outer coolant sleeve of the cooling cartridge for leading the coolant from the plurality of coolant channels to a main coolant output. The main coolant output can be provided in a housing or frame structure internal or external to the electric machine cooling system.

The electric machine cooling system, in particular the closing cap shaft, can comprise a coolant input cylinder arranged inside and coaxial to the closing cap shaft. The coolant input cylinder is in some embodiments configured as a separate component, separate from the closing cap shaft body. This further increases adaptability of the overall configuration. In a separated configuration, the coolant input shaft is fixedly attached to the closing cap shaft body, e.g. by a sealing arrangement, so as to be rotatable together with the closing cap shaft body. Alternatively, the coolant input cylinder can be formed integral with the closing cap shaft, e.g. by additive manufacturing.

An inner cavity of the coolant input cylinder can provide the inlet passage of the closing cap shaft that is fluidically connected with the inlet opening of the cooling cartridge. To this, an end section of the coolant input cylinder can extend beyond the end surface of the closing cap shaft body and can be received in and attached to a receiving section of the inner coolant tube, e.g. by a sealing arrangement.

The at least one outlet passage of the closing cap shaft can be provided between the coolant input cylinder and the closing cap shaft, namely between an outer circumferential surface of the coolant input cylinder and an inner circumferential surface of the closing cap shaft body.

In an embodiment, the closing cap shaft can comprise at least one lubrication path that fluidically connects the at least one outlet passage with a first bearing arrangement that rotatably supports the inner rotor. The at least one lubrication path can be provided independent of particular embodiments and configurations of the closing cap shaft. The at least one lubrication path is configured to lubricate the first bearing arrangement by the coolant, in particular if the coolant is oil. Thus, the electric machine cooling system can at the same time be designed to efficiently cool the inner rotor of the electric machine and to efficiently lubricate and cool an electric machine bearing arrangement (in particular a rear bearing arrangement). More than one lubrication path, in some embodiments a plurality of lubrication paths, can be formed in the closing cap shaft. The lubrication paths can be evenly distributed circumferentially around the closing cap shaft body.

In an embodiment, the closing cap shaft can comprise a bearing portion that provides a bearing surface for the first bearing arrangement (rear bearing arrangement) for rotatably mounting the cooling cartridge and the inner rotor on a housing or frame structure.

The at least one lubrication path can be provided close to, adjacent the bearing surface. The at least one lubrication path can be inclined with respect to the axis of rotation and with respect to a flow direction of the coolant in the outlet passage.

According to an embodiment, the inner hollow shaft can comprise an end portion that provides a further bearing surface for a second bearing arrangement (front bearing arrangement) for rotatably mounting the cooling cartridge and the inner rotor on a housing or frame structure. This realizes a direct rotatable support via the inner hollow shaft. The end portion can be axially spaced from the closing cap shaft, i.e. can face away from the closing cap shaft. The end portion can be located on the side on which the inner hollow shaft provides a mechanical link to an output shaft of the electric machine.

In an embodiment, the inner rotor can be provided with permanent magnets, in particular embedded permanent magnets. The inner rotor can in some embodiments be configured as an interior permanent magnet (IPM) type rotor. Such an arrangement is advantageous in view of reluctance torque and reduces the risk that magnets are disengage from the inner rotor during operation due to centrifugal forces. Alternatively, the inner rotor can comprise surface permanent magnets (SPM).

According to an embodiment, the outer stator can be cooled in addition to the inner rotor, which further increases overall cooling efficiency.

Another aspect of the disclosure relates to a method for cooling an electric machine, in particular an electric machine for a vehicle, the electric machine having an inner rotor and an outer stator, the inner rotor being rotatable about an axis of rotation and having or forming an inner hollow shaft. In particular, the electric machine is cooled by an electric machine cooling system of the type described above.

The electric machine is cooled by a cooling cartridge arranged inside and coaxial to the inner hollow shaft of the inner rotor, the cooling cartridge being a polymer cartridge that is interchangeably attached to the inner rotor so as to rotate with the inner rotor about the axis of rotation.

The method comprises the steps:
introducing a coolant into an inlet opening of an inner coolant tube of the cooling cartridge,
leading the coolant through an internal coolant duct of the inner coolant tube from the inlet opening of the inner coolant tube to a closed dead-end of the cooling cartridge,
leading the coolant from the internal coolant duct through at least one connection channel arranged in a region of the closed dead-end into a plurality of coolant channels of an outer coolant sleeve, the outer coolant sleeve being arranged between the inner coolant tube and the inner rotor, and
leading the coolant through the plurality of coolant channels from the at least one connection channel to at least one outlet opening of the outer coolant sleeve.

In an embodiment of the method, the coolant channels can be formed on an outer circumferential surface of the outer coolant sleeve as radially open coolant channels that are enclosed by the outer circumferential surface of the outer coolant sleeve and an inner circumferential surface of the inner hollow shaft. The coolant is in direct contact with the outer circumferential surface of the outer coolant sleeve and the inner circumferential surface of the inner hollow shaft when flowing through the coolant channels.

Even though some of the features, functions, embodiments, technical effects and advantages have been described with regard to one aspect, it will be understood that these features, functions, embodiments, technical effects and advantages can be combined with one another also applying to other embodiments and aspects. In particular, features, functions, embodiments, technical effects and advantages have been described with regard to the electric machine cooling system can also apply for the method for cooling an electric machine.

BRIEF DESCRIPTION OF THE DRAWINGS

For a better understanding of embodiments of the disclosure and to show how the same may be carried into effect, reference will now be made, purely by way of example, to the accompanying drawings in which like numerals designate corresponding elements or sections throughout.

In the accompanying drawings.

DETAILED DESCRIPTION

Various examples of embodiments of the present disclosure will be explained in more detail by virtue of the following embodiments illustrated in the figures and/or described below.

Figure 1:
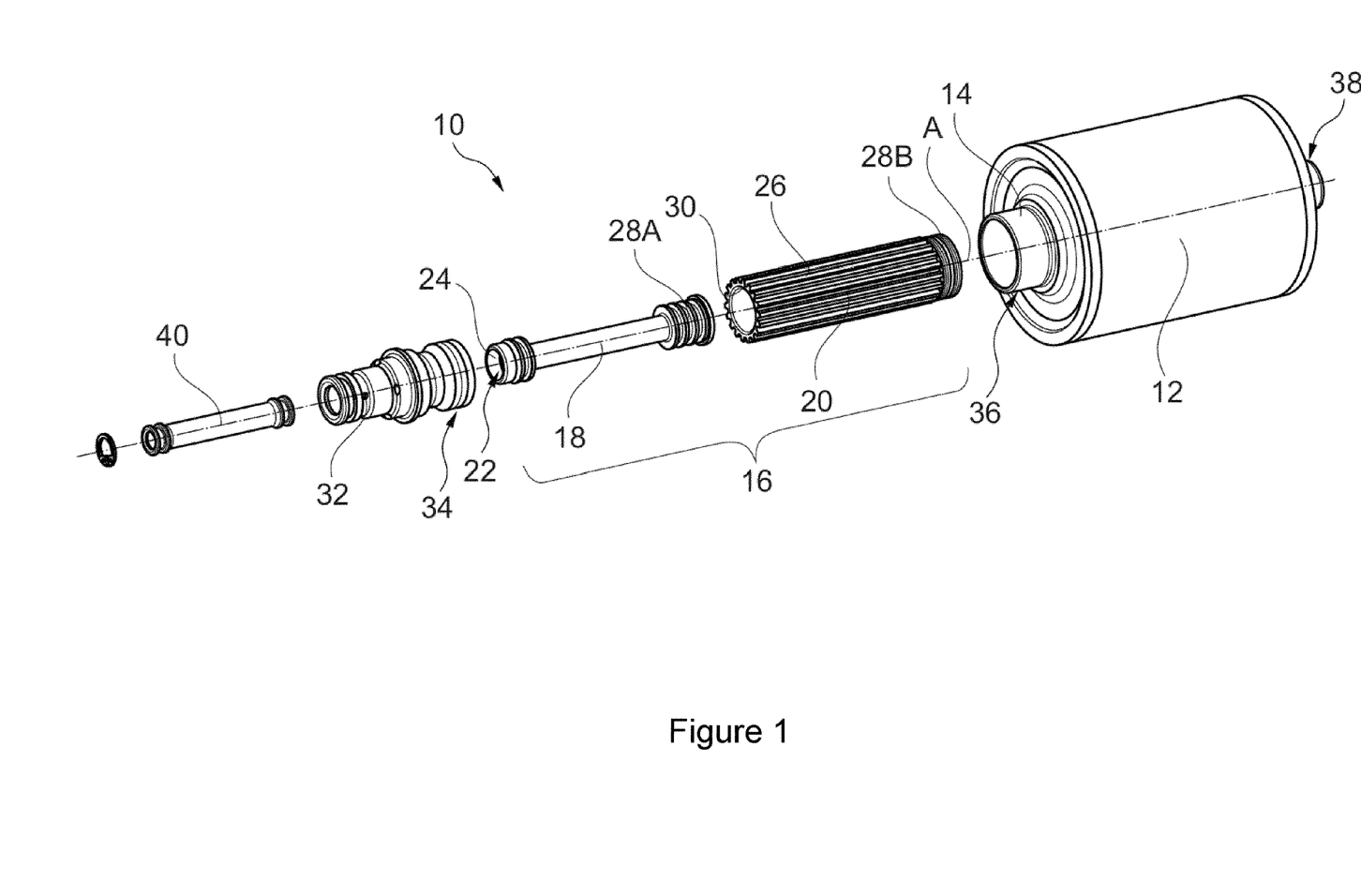
FIG. 1 shows a schematic exploded view of a part of an electric machine cooling system according to an embodiment.
Figure 2:
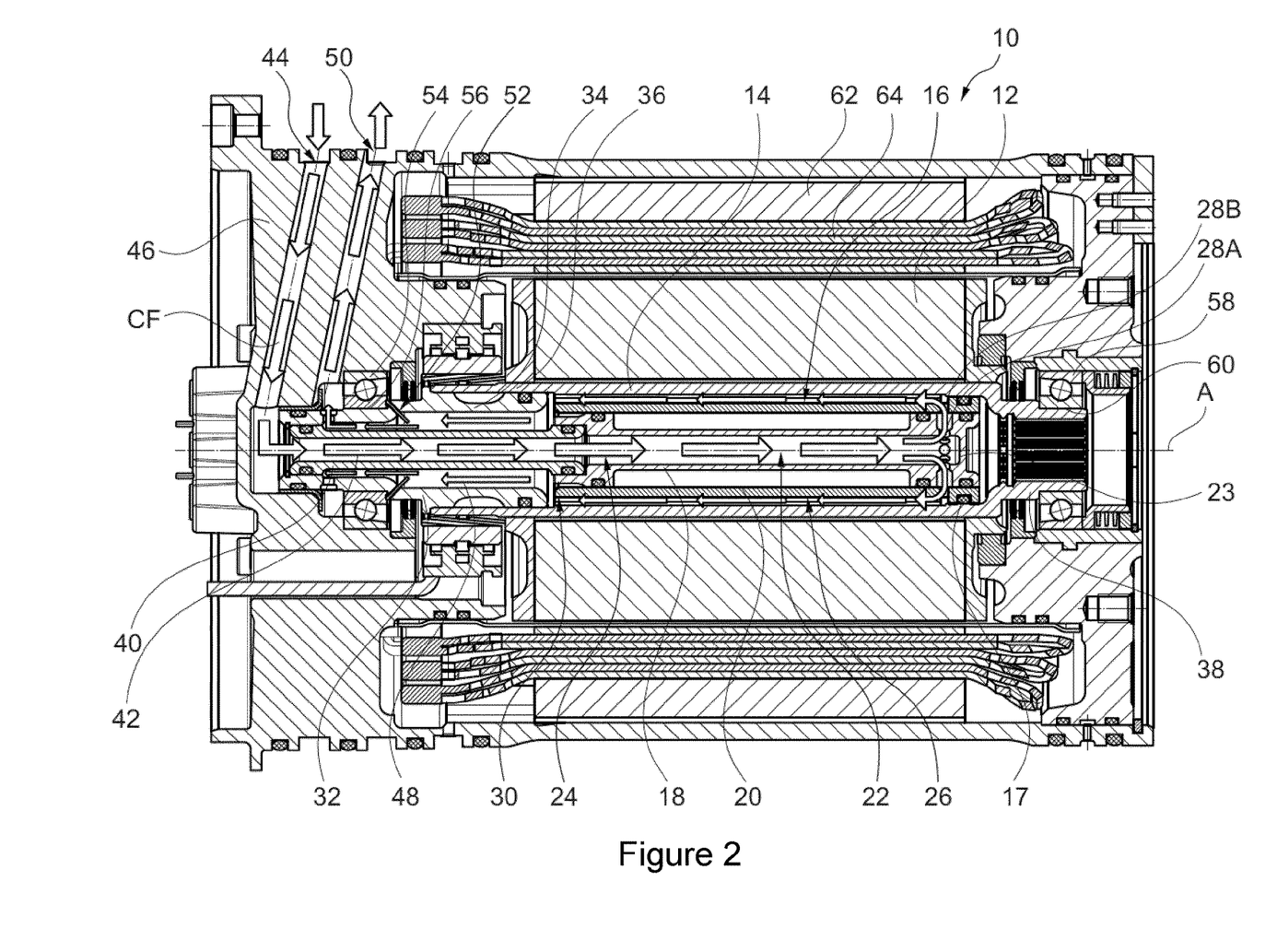
FIG. 2 shows a schematic cross-sectional view of the electric machine cooling system of FIG. 1 along its longitudinal axis.
Figure 3:
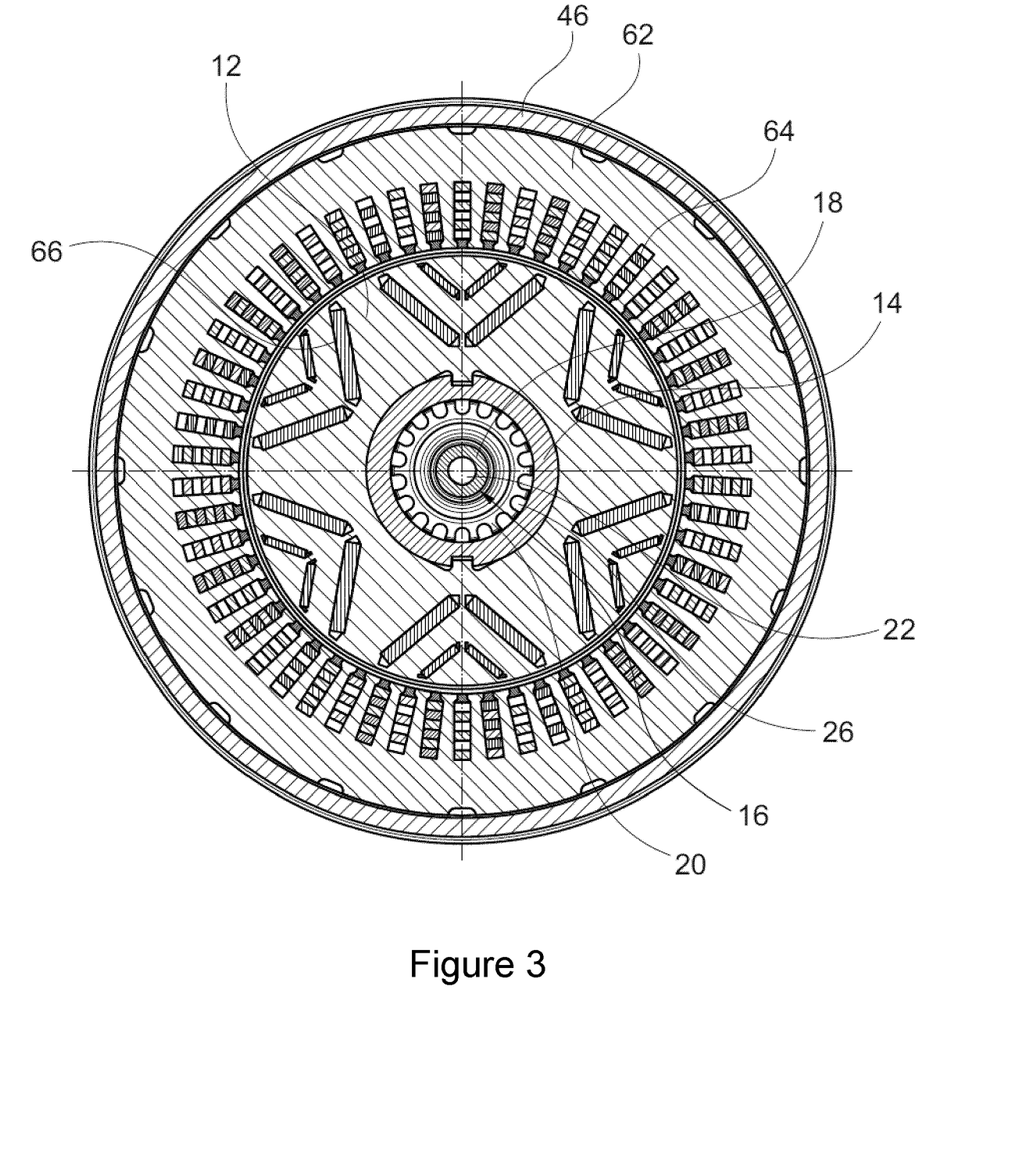
FIG. 3 shows a schematic cross-sectional view of the electric machine cooling system of FIG. 1 transversely to its longitudinal axis.

FIG. 1 shows an exploded view of an inner part of an electric machine cooling system 10 (the stator part is not shown in FIG. 1), while FIGS. 2 and 3 show cross-sectional views of the electric machine cooling system 10.

The electric machine cooling system 10 comprises an inner rotor 12 that is rotatable about an axis of rotation A. The inner rotor 12 comprises an inner hollow shaft 14 that is fixedly attached to an inner circumferential surface of an inner rotor shaft so as to be rotatable with the inner rotor 12 about the axis of rotation. The inner rotor 12 and the inner hollow shaft 14 are not moveable relative to each other in an assembled state of the electric machine cooling system 10. In this embodiment, the inner rotor 12 and the inner hollow shaft 14 are separate components. However, in alternative embodiments, it is possible that the inner rotor shaft itself forms the inner hollow shaft.

The electric machine cooling system 10 further comprises a cooling cartridge 16 that is arrangeable inside and coaxial to the inner hollow shaft 14. The cooling cartridge 16 is interchangeably attachable to the inner rotor 12, in particular by bearing arrangements 17 (see FIG. 2). The cooling cartridge 16 is interchangeably attachable to the inner rotor 12 in a non-rotatable manner relative to the inner rotor 12. Consequently, the cooling cartridge 16 is rotatable together with the inner rotor 12 about the axis of rotation A.

The axis of rotation A also embodies the longitudinal axis of the electric machine 10, i.e. also of the inner rotor 12, the inner hollow shaft 14 and the cooling cartridge 16.

The cooling cartridge 16 is made of a polymer material, in some embodiments PPA+GF (Polyphthalamide+Glass Fiber).

The cooling cartridge 16 comprises an inner coolant tube 18 and an outer coolant sleeve 20. The inner coolant tube 18 is received in the inside of the outer coolant sleeve 20 in an assembled state of the electric machine cooling system 10. Hence, the outer coolant sleeve 20 is arranged between the inner coolant tube 18 and the inner rotor 12, more precisely between the inner coolant tube 18 and the inner hollow shaft 14 of the inner rotor 12. The inner coolant tube 18 and the outer coolant sleeve 20 are fixedly attachable to each other so as to be non-displaceable and non-rotatable relative to each other.

The inner coolant tube 18 has an internal coolant duct 22 extending in the axial direction from one end of the inner coolant tube 18 towards an opposite end of the inner coolant tube 18. The inner coolant tube 18 does not extend completely through the inner coolant tube 18, but only extends to a closed dead-end 23 (see FIG. 2) of the cooling cartridge 16. In the shown embodiment, the closed dead-end 23 is a dead-end of the inner coolant tube 18 (see FIG. 2). The internal coolant duct 22 is configured to lead coolant, in some embodiments oil, from an inlet opening 24 of the inner coolant tube 18 to the closed dead-end 23.

The outer coolant sleeve 20 is provided with a plurality of coolant channels 26 formed on an outer circumferential surface of the outer coolant sleeve 20. In the shown embodiment, the coolant channels 26 each extend in an axial direction parallel to the axis of rotation A over substantially the complete axial length of the outer coolant sleeve 20 (except for an end portion of the outer coolant sleeve 20). As can be seen in FIGS. 1, 2 and 3, the coolant channels 26 are not closed, but are radially open, when only considering the outer coolant sleeve 20, i.e. in an unassembled state. Each of the coolant channels 26 is radially open in a direction facing away from the axis of rotation A over its complete axial extension. The coolant channels 26 are radially closed by the inner circumferential surface of the inner hollow shaft 14, when the electric machine cooling system 10 is assembled. The coolant flowing through the coolant channels 26 can thus be in direct contact with the outer circumferential surface of the outer coolant sleeve 20 and in direct contact with the inner circumferential surface of the inner hollow shaft 14 so as to efficiently cool the inner rotor. In the shown embodiment, each of the coolant channels 26 forms an individual closed coolant channel 26.

At least one connection channel 28A, 28B is formed in the inner coolant tube 18 and the outer coolant sleeve 20. In other words, the at least one connection channel 28A, 28B extends through both the inner coolant tube 18 and the outer coolant sleeve 20 so as to fluidically connect the inner coolant duct 22 with the plurality of coolant channels 26. To this, the at least one connection channel 28A, 28B comprises a first portion 28A formed in the inner coolant tube 18 and comprises a second portion 28B formed in the outer coolant sleeve 20. The first portion 28A and the second portion 28B of the connection channel 28 are aligned with one another. In the shown embodiment, the at least one connection channel 28A, 28B extends in a radial direction with respect to the axis of rotation A.

The coolant channels 26 are configured to lead the coolant from the at least one connection channel 28A, 28B to at least one outlet opening 30 of the outer coolant sleeve 20. Here, each of the coolant channels 26 has an outlet opening 30 on an end of the coolant sleeve 20 axially opposite to an end at which the at least one connection channel 28A, 28B is formed.

The electric machine cooling system 10 further comprises a closing cap shaft 32 that is aligned with, coaxial to and arrangeable adjacent to the cooling cartridge 16 so as to fasten the cooling cartridge 16 inside the inner hollow shaft 14 of the inner rotor 12 in an assembled state of the electric machine cooling system 10. On a side axially opposite to the closing cap shaft 32, the cooling cartridge 16 abuts an inside of the inner hollow shaft 14, more precisely of an inwardly tapering portion of the inner hollow shaft 14. Thus, in an assembled state of the electric machine cooling system 10, the cooling cartridge 16 is axially fixed inside the inner hollow shaft 14.

The closing cap shaft 32 has an insertion portion 34 located at an end of the closing cap shaft 32 facing the cooling cartridge 16. The closing cap shaft 32 is received in an extending portion 36 of the inner hollows shaft 14, which extending portion 36 extends beyond the inner rotor 12 in a direction towards the closing cap shaft 32. The extending portion 36 of the inner hollow shaft 14 is located axially opposite to a link portion 38 of the inner hollow shaft 14, which link portion 38 provides a mechanical link to an output shaft (not shown) of the electric machine. The closing cap shaft 32 is attachable to the inner hollow shaft 14 in a non-rotatable manner relative to the inner hollow shaft 14 so as to be rotatable together with the inner hollow shaft 14 and the cooling cartridge 16 about the axis of rotation A. The closing cap shaft 32 axially abuts the cooling cartridge 16 and thus secures the cooling cartridge 16 axially in the inner rotor 12.

A coolant input cylinder 40 is arrangeable inside and coaxial to the closing cap shaft 32. The inner cavity of the coolant input cylinder 40 provides an inlet passage 42 (see FIG. 2) fluidically connected with the inlet opening 24 of the inner coolant tube 18 for leading the coolant from a main coolant input 44 provided in a housing 46 of the electric machine cooling system 10 to the internal coolant duct 22. Further, the coolant input cylinder 40 and the closing cap shaft 32 together form at least one outlet passage 48 between an outer circumferential surface of the coolant input cylinder 40 and an inner circumferential surface of the closing cap shaft 32. The at least one outlet passage 48 is fluidically connected with the at least one outlet opening 30 of the outer coolant sleeve 20 for leading the coolant from the plurality of coolant channels 26 to a main coolant output 50 provided in the housing 46 of the electric machine cooling system 10.

For fluidically connecting the inlet passage 42 of the coolant input cylinder 40 with the inlet opening 24 of the inner coolant tube 18, an end portion of the coolant input cylinder 40 is received in a receiving portion of the inner coolant tube 18. A sealing element is arranged between the end portion of the coolant input cylinder 40 and the receiving portion of the inner coolant tube 18.

Arrows CF show the coolant flow through the electric machine cooling system.

The closing cap shaft 32 has at least one lubrication path 52 or lubrication channel 52 (see FIG. 2). The lubrication path 52 fluidically connects the at least one outlet passage 48 with a first bearing arrangement 54 for lubricating the first bearing arrangement 54. The lubrication path 52 has an inclined orientation relative to the axis of rotation A and relative to the extension of the outlet passage 48.

The first bearing arrangement 54 constitutes the rear bearing of the inner rotor 12, which rotatably supports the inner rotor 12, and thus the inner hollow shaft 14, the cooling cartridge 16, the closing cap shaft 32, and the coolant input cylinder 40, on a lateral side of the inner rotor 12 opposite to a lateral side of the inner rotor 12 on which the output shaft of the electric machine is attachable to the mechanical link. The first bearing arrangement 54 is mounted on a bearing portion 56 of the closing cap shaft 32, which bearing portion 56 provides a bearing surface for the first bearing arrangement 54.

A second bearing arrangement 58 for rotatably supporting the inner rotor 12, and thus the inner hollow shaft 14, the cooling cartridge 16, the closing cap shaft 32, and the coolant input cylinder 40, is provided on the lateral side of the inner rotor 12 on which the output shaft of the electric machine is attachable to the mechanical link, i.e. opposite to the lateral side of the inner rotor 12 at which the first bearing arrangement 54 is located. The second bearing arrangement 58 constitutes the front bearing of the inner rotor 12. The second bearing arrangement 58 is mounted on an end portion 60 of the inner hollow shaft 14, which end portion 60 provides a bearing surface for the second bearing arrangement 58.

Hence, the cooling cartridge 16 is rotatably supported on the housing 46 directly via the inner hollow shaft 14 on a front side of the electric machine cooling system 10 (i.e. the mechanical link side) and is rotatably supported on the housing 46 indirectly via the inner hollow shaft 14 on a rear side.

As can be seen in the Figures, in particular in FIG. 2, the components of the electric machine cooling system 10 are attached to each other, inter alia, by sealing arrangements, such as O-rings and/or other sealing rings and elements. For the sake of clarity and overview, the sealing arrangements are not provided with reference signs.

The electric machine of the electric machine cooling system 10 further comprises an outer stator 62 provided with stator windings 64.

As can be seen in FIG. 3, the inner rotor 12 comprises embedded permanent magnets 66. The inner rotor 12 is configured as an interior permanent magnet (IPM) type rotor. The embedded permanent magnets 66 can have the shape, orientation and/or arrangement as shown in FIG. 3 or can have a different shape, orientation and/or arrangement in other embodiments.

LIST OF REFERENCE SIGNS

| | |
|---|---|
| 10 | electric machine cooling system |
| 12 | inner rotor |
| 14 | inner hollow shaft |
| 16 | cooling cartridge |
| 18 | inner coolant tube |
| 20 | outer coolant sleeve |
| 22 | internal coolant duct |
| 24 | inlet opening |
| 26 | coolant channel |
| 28A, 28B | connection channel |
| 30 | outlet opening |
| 32 | closing cap shaft |
| 34 | insertion portion |
| 36 | extending portion |
| 38 | link portion |
| 40 | coolant input cylinder |
| 42 | inlet passage |
| 44 | main coolant input |
| 46 | housing |
| 48 | outlet passage |
| 50 | main coolant output |
| 52 | lubrication path |
| 54 | first bearing arrangement |
| 56 | bearing portion |
| 58 | second bearing arrangement |
| 60 | end portion |
| 62 | outer stator |
| 64 | stator windings |
| 66 | permanent magnets |
| A | axis of rotation |
| CF | coolant flow |

What is claimed is:

1. An electric machine cooling system comprising:
    an electric machine having an inner rotor (12) and an outer stator, the inner rotor being rotatable about an axis of rotation and having or forming an inner hollow shaft;
    a cooling cartridge arranged inside and coaxial to the inner hollow shaft of the inner rotor, the cooling cartridge being interchangeably attached to the inner rotor so as to be rotatable with the inner rotor about the axis of rotation the cooling cartridge comprising:
        an inner coolant tube having an internal coolant duct configured to lead coolant from an inlet opening of the inner coolant tube to a closed dead-end of the cooling cartridge, and
        an outer coolant sleeve, the outer coolant sleeve being arranged between the inner coolant tube and the inner rotor and comprising a plurality of coolant channels which are fluidically connected with the internal coolant duct via at least one connection channel in a region of the closed dead-end and which are configured to lead the coolant from the at least one connection channel to at least one outlet opening of the outer coolant sleeve; and
    a closing cap shaft being aligned with and arranged adjacent to the cooling cartridge so as to secure the cooling cartridge inside the inner hollow shaft of the inner rotor,
    wherein the closing cap shaft provides an inlet passage fluidically connected with the inlet opening of the inner coolant tube of the cooling cartridge for leading the coolant from a main coolant input to the internal coolant duct,
    wherein the closing cap shaft provides at least one outlet passage fluidically connected with the at least one outlet opening of the outer coolant sleeve of the cooling cartridge for leading the coolant from the plurality of coolant channels to a main coolant output, and
    wherein the cooling cartridge is a polymer cartridge and the closing cap shaft comprises at least one lubrication path that fluidically connects the at least one outlet passage with a first bearing arrangement for lubricating the first bearing arrangement.

2. The electric machine cooling system of claim 1, wherein the inner coolant tube and the outer coolant sleeve are separate components that are attached to each other by sealing arrangements.

3. The electric machine cooling system of claim 1, wherein the coolant channels are formed on an outer circumferential surface of the outer coolant sleeve as radially open coolant channels, wherein the coolant channels are enclosed by the outer circumferential surface of the outer coolant sleeve and an inner circumferential surface of the inner hollow shaft.

4. The electric machine cooling system of claim 1, wherein the cooling cartridge is rotatably supported on a housing via the inner hollow shaft of the inner rotor.

5. The electric machine cooling system of claim 1, wherein an insertion portion of the closing cap shaft extends into the inner hollow shaft and is attached to the inner hollow shaft so as to be rotatable with the inner rotor about the axis of rotation.

6. The electric machine cooling system of claim 1, further comprising a coolant input cylinder arranged inside and coaxial to the closing cap shaft,
    wherein at least one of:
        (i) an inner cavity of the coolant input cylinder provides the inlet passage, or
        (ii) the at least one outlet passage is provided between the coolant input cylinder and the closing cap shaft.

7. The electric machine cooling system of claim 1, wherein the closing cap shaft comprises a bearing portion that provides a bearing surface for the first bearing arrangement for rotatably mounting the cooling cartridge and the inner rotor.

8. The electric machine cooling system of claim 1, wherein the inner hollow shaft comprises an end portion that provides a further bearing surface for a second bearing arrangement for rotatably mounting the cooling cartridge and the inner rotor.

9. The electric machine cooling system of claim 1, wherein the inner rotor is provided with permanent magnets.

10. The electric machine cooling system of claim 1, wherein the outer stator is cooled in addition to the inner rotor.

11. A method for cooling an electric machine, the method comprising the steps of:

providing an electric machine cooling system according to claim 1;

introducing a coolant into an inlet opening of an inner coolant tube of the cooling cartridge, leading the coolant through an internal coolant duct of the inner coolant tube from the inlet opening of the inner coolant tube to a closed dead-end of the cooling cartridge, leading the coolant from the internal coolant duct through at least one connection channel arranged in a region of the closed dead-end into a plurality of coolant channels of an outer coolant sleeve, the outer coolant sleeve being arranged between the inner coolant tube and the inner rotor, and leading the coolant through the plurality of coolant channels from the at least one connection channel to at least one outlet opening of the outer coolant sleeve.

12. The method of claim 11, wherein the coolant channels are formed on an outer circumferential surface of the outer coolant sleeve as radially open coolant channels that are enclosed by the outer circumferential surface of the outer coolant sleeve and an inner circumferential surface of the inner hollow shaft, wherein the coolant is in direct contact with the outer circumferential surface of the outer coolant sleeve and the inner circumferential surface of the inner hollow shaft when flowing through the coolant channels.

13. The electric machine cooling system of claim 1, wherein the inner rotor is configured as an interior permanent magnet type rotor.

* * * * *